(12) United States Patent
Springborn et al.

(10) Patent No.: US 9,793,701 B2
(45) Date of Patent: Oct. 17, 2017

(54) SURGE ARRESTER

(71) Applicant: SIEMENS AKTIENGESELLSCHAFT, Munich (DE)

(72) Inventors: Dirk Springborn, Berlin (DE); Markus Sulitze, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 320 days.

(21) Appl. No.: 14/422,016

(22) PCT Filed: Jun. 20, 2013

(86) PCT No.: PCT/EP2013/062825
§ 371 (c)(1),
(2) Date: Feb. 17, 2015

(87) PCT Pub. No.: WO2014/026785
PCT Pub. Date: Feb. 20, 2014

(65) Prior Publication Data
US 2015/0244162 A1    Aug. 27, 2015

(30) Foreign Application Priority Data

Aug. 16, 2012  (EP) .................................. 12180619

(51) Int. Cl.
  *H01C 7/12*    (2006.01)
  *H02H 9/04*    (2006.01)
  *H02H 3/02*    (2006.01)

(52) U.S. Cl.
  CPC ............... *H02H 3/025* (2013.01); *H01C 7/12* (2013.01); *H01C 7/126* (2013.01); *H02H 9/041* (2013.01)

(58) Field of Classification Search
  CPC . H01C 7/12; H02H 9/04; H02H 9/005; H92H 9/041
  USPC ......................................................... 361/118
  See application file for complete search history.

(56) References Cited

U.S. PATENT DOCUMENTS

| 4,352,139 A | 9/1982 | Du Pont et al. |
| 2003/0210508 A1 | 11/2003 | Zeller et al. |
| 2010/0103581 A1* | 4/2010 | Kruska .................... H01C 7/12 361/118 |
| 2010/0321850 A1 | 12/2010 | Barenthin et al. |

FOREIGN PATENT DOCUMENTS

| CN | 101675486 A | 3/2010 |
| CN | 101939800 A | 1/2011 |
| DE | 102007010857 A1 | 9/2008 |
| EP | 1357649 A1 | 10/2003 |

* cited by examiner

*Primary Examiner* — Dharti Patel
(74) *Attorney, Agent, or Firm* — Laurence Greenberg; Werner Stemer; Ralph Locher

(57) ABSTRACT

A surge arrester, in particular for arresting surges, includes a housing and a disconnecting device. The housing is divided into at least two housing parts, and the disconnecting device connects the housing parts to one another.

12 Claims, 1 Drawing Sheet

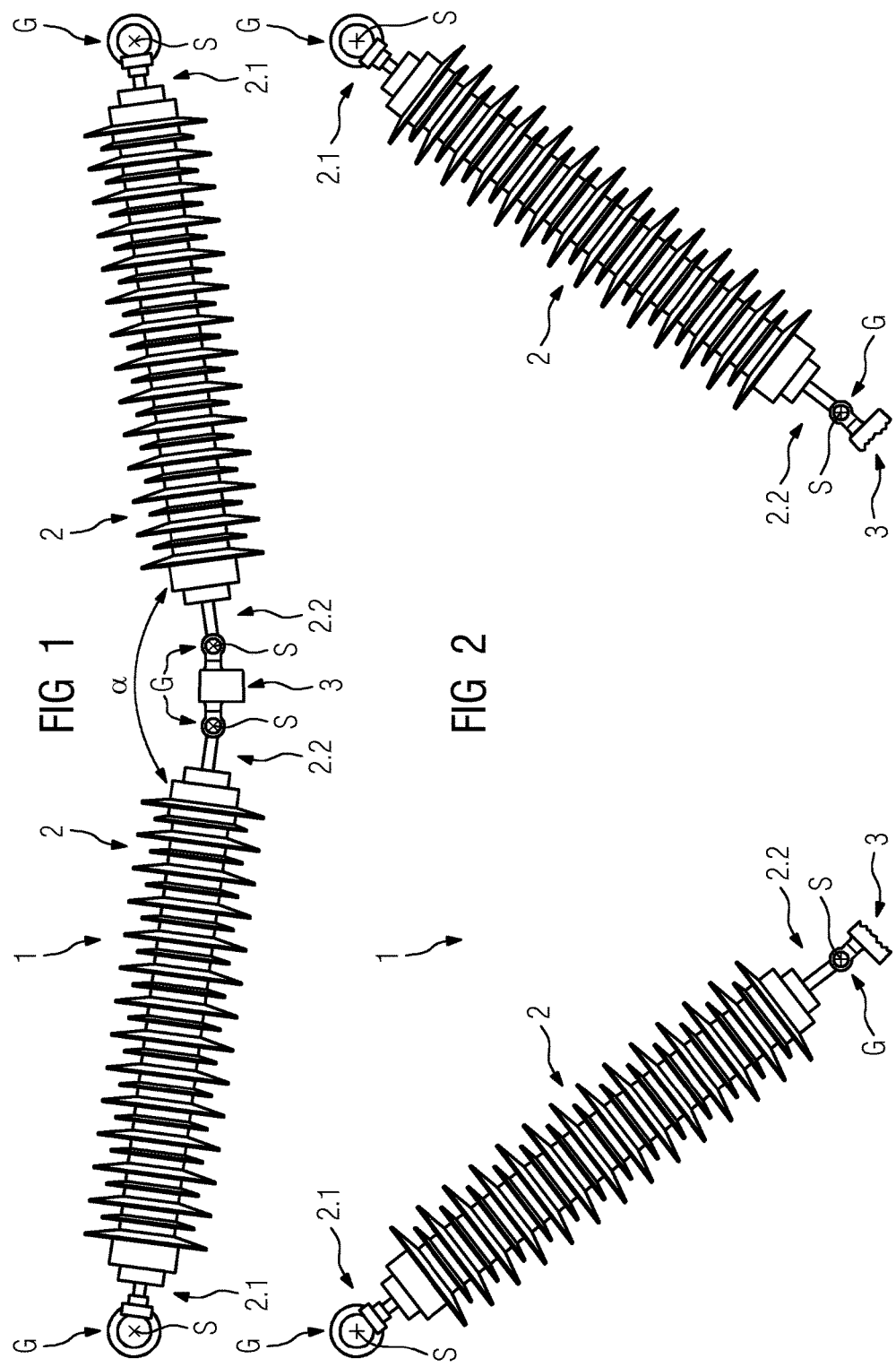

SURGE ARRESTER

BACKGROUND OF THE INVENTION

Field of the Invention

The invention relates to a surge arrester, in particular for arresting surges.

For protection against surges it is known to use surge arresters, which dissipate the high current to ground for example owing to indirect or direct lightning strikes in an installation or in the case of switching surges. Such surge arresters, also called arresters for short, are suspended in parallel with an insulator for example in overhead lines or power supply systems.

Surge arresters usually comprise a volume resistance, in particular a voltage-dependent resistance, e.g. a metal oxide resistor, and a disconnecting device, which are arranged in a common housing. The housing has connection terminals for at least one active conductor and for the grounding.

BRIEF SUMMARY OF THE INVENTION

It is an object of the invention to specify a surge arrester which enables a reliable and simple disconnection of the disconnecting device, in particular even when the available space is small.

The object is achieved according to the invention by a surge arrester as described below.

The dependent claims relate to developments of the invention.

The surge arrester according to the invention, in particular for arresting surges, comprises a housing and a disconnecting device, wherein the housing is subdivided into at least two housing parts and the disconnecting device connects the housing parts to one another.

By virtue of such an intermediate arrangement of the disconnecting device and the resultant divided embodiment of the surge arrester, compared with conventional surge arresters, particularly those of the same design, in which the disconnecting device is arranged at the end side of the housing, the disconnecting device is subjected to less mechanical stress, in particular with regard to acting transverse forces. Furthermore, the division of the long housing into short housing parts has the advantage that the housing parts are not exposed to the same high forces as a long single housing. Reliable surge protection in conjunction with a small space requirement is furthermore made possible.

The invention enables an integrated structural unit comprising surge arrester and disconnecting device, wherein surge protection and the mechanical disconnection function are combined in one structural unit.

One development provides for the disconnecting device to connect the housing parts to one another centrally. As a result, the disconnecting device is subjected almost exclusively to tensile stress, such that a disconnection of the housing parts apart from the disconnecting device itself can be effected largely nondestructively.

A further embodiment of the invention provides for the housing parts to be arranged at a predefined angle of less than 180° with respect to one another when the disconnecting device is closed. The angular position of the housing parts with respect to one another brings about length equalization in a simple manner.

In one possible embodiment, the disconnecting device is mounted rotatably on the respectively associated housing part. As a result of the rotatable mounting at the outer ends of the housing parts and the connection of the housing parts that is disconnectable at the inner ends of the housing parts, the housing parts upon the triggering of the disconnecting device can be disconnected from one another simply and reliably by means of the housing parts pivoting away or swinging away in the direction of the grounding side or the voltage side. Owing to the short lengths of the housing parts in comparison with surge arresters that are of identical design and have a single long housing, the surge arrester according to the invention can be used even in the case of lines arranged one above another at a small distance.

The housing parts are electrically and mechanically connected to one another by means of the disconnecting device in the non-disconnected and thus non-destroyed state.

For easy releaseable connection and for length equalization, in particular on account of load changes on the line, the housing parts are mounted, in particular suspended, rotatably at the end side in each case by means of an associated joint. In this case, the respective joint has a pivoting axis running transversally with respect to the longitudinal axis of the housing parts and is embodied as a ball-and-socket joint, universal joint or rotary joint.

The combination of housing parts rotationally mounted at the end and thus both sides and the arrangement of said housing parts at an angle with respect to one another makes it possible for length changes caused by load changes to be compensated for simply and reliably.

For connecting the housing to the ground line, one of the outer rotationally mounted ends of one of the housing parts is suspended on the ground side.

For connecting the housing to at least one active conductor, one of the outer rotationally mounted ends of one of the housing parts is suspended on the voltage side, in particular on the high voltage side.

BRIEF DESCRIPTION OF THE SEVERAL VIEWS OF THE DRAWING

The above-described properties, features and advantages of this invention and the way in which they are achieved will become clearer and more clearly understood in association with the following description of exemplary embodiments which are explained in greater detail in association with the drawings, in which:

FIG. 1 schematically shows one exemplary embodiment of a surge arrester comprising two housing parts and a disconnecting device arranged there between in the closed and thus non-disconnected state, and FIG. 2 schematically shows a surge arrester comprising two housing parts and a disconnecting device there between in the open and thus disconnected state.

DESCRIPTION OF THE INVENTION

Mutually corresponding parts are provided with the same reference signs in the figures.

FIG. 1 schematically shows a surge arrester 1 for protection against surges for example on account of indirect or direct lightning strikes in an installation or switching surges.

Such a surge arrester 1, also called arrester for short, is suspended in parallel with an insulator (not illustrated in more specific detail) for example in overhead lines.

The surge arrester 1 is embodied in a divided fashion and comprises two housing parts 2 for a volume resistance (not illustrated in more specific detail) for example a metal oxide resistor. A disconnecting device 3 is arranged between the two housing parts 2. The divided surge arrester 1 is designed for a voltage level, e.g. for 96 kV, 110 kV or 145 kV.

The disconnecting device 3 serves, in the event of a fault, to interrupt the active conductor or connection path by disconnecting the housing parts 2. For this purpose, the disconnecting device 3 can have a switching section, for example, which brings about an irreversible disconnection of the connection path. For the irreversible disconnection, use can be made of a propellant charge, for example, which destroys the connection between the housing parts 2 by disconnecting the disconnecting device 3 itself at points. The disconnecting device 3 can advantageously have a rotationally symmetrical structure which is inserted into the connection between the housing parts 2.

The ends 2.1 of the housing parts 2 which face away from one another and are thus the outer ends have connection terminals for at least one active conductor (not illustrated in more specific detail) and for the grounding (not illustrated in more specific detail). Furthermore, the housing parts 2 are mounted, in particular suspended, rotatably at their outer ends 2.1.

The ends 2.2 of the housing parts 2 which face one another and are thus the inner ends are connected to one another releasably by means of the disconnecting device 3.

The disconnecting device 3 is shown in the non-disconnected state in FIG. 1.

The disconnecting device 3 connects the housing parts 2 to one another centrally, as a result of which the disconnecting device 3 is subjected almost exclusively to tensile stress.

Furthermore, the housing parts 2 are arranged at a predefined angle α of less than 180° with respect to one another when the disconnecting device 3 is not disconnected, as a result of which length equalization is brought about in a simple manner.

The disconnecting device 3 connects the housing parts 2 to one another releasably. The housing parts 2 are electrically and mechanically connected to one another by means of the disconnecting device 3 in the closed and thus non-disconnected state.

The disconnecting device 3 is mounted rotatably at the end side on the respectively associated housing part 2.

For easy disconnectable connection, the housing parts 2 are mounted, in particular suspended, rotatably at the end side, both at the inner end 2.2 and at the outer end 2.1, in each case by means of an associated joint G. The respective joint G has a pivoting axis S running transversally with respect to the longitudinal axis of the housing parts 2.

The respective joint G is embodied as a rotary joint. Alternatively, the joint G in a manner not illustrated in more specific detail can be embodied as a ball-and-socket joint or universal joint.

As a result of the rotatable mounting at the outer ends 2.1 and inner ends 2.2 of the housing parts 2 and the connection of the housing parts 2 that is disconnectable at the inner ends 2.2 of the housing parts 2, said housing parts, upon the triggering and thus disconnection of the disconnecting device 3, can be disconnected from one another simply and reliably by means of the housing parts 2 pivoting away or swinging away in the direction of the grounding side or the voltage side, as illustrated in FIG. 2.

In this case, FIG. 2 shows the surge arrester 1 comprising two housing parts 2 and the disconnecting device 3 arranged there between in the open and thus disconnected state of the disconnecting device 3. Here in the case of a fault, for example, a propellant charge (not illustrated in more specific detail) in the disconnecting device 3 is triggered, as a result of which the disconnecting device 3 is disconnected in a defined manner and thus destroyed, such that the housing parts 2 are disconnected from one another and pivot away from one another.

Although the invention has been more specifically illustrated and described in detail by means of preferred exemplary embodiments, nevertheless the invention is not restricted by the examples disclosed, and other variations can be derived there from by the person skilled in the art, without departing from the scope of protection of the invention.

The invention claimed is:

1. A surge arrester to be connected to an active conductor along a connection path, the surge arrester comprising:
    a housing being subdivided into at least two housing parts; and
    a disconnecting device connecting said at least two housing parts to one another, said disconnecting device, in an event of a fault, interrupting the active conductor or connection path by disconnecting said at least two housing parts.

2. The surge arrester according to claim 1, wherein said disconnecting device connects said at least two housing parts to one another centrally.

3. The surge arrester according to claim 1, wherein said at least two housing parts are disposed at a predefined angle of less than 180° with respect to one another when said disconnecting device is closed.

4. The surge arrester according to claim 1, wherein said at least two housing parts have end sides, and said disconnecting device is mounted rotatably at a respective one of said end sides of each of said at least two housing parts.

5. The surge arrester according to claim 1, wherein said at least two housing parts are two housing parts, and said disconnecting device mechanically and electrically interconnects said two housing parts.

6. The surge arrester according to claim 1, wherein said at least two housing parts have end sides, and joints each rotatably mount a respective one of said at least two housing parts at a respective one of said end sides.

7. The surge arrester according to claim 6, wherein said joints suspend said at least two housing parts.

8. The surge arrester according to claim 6, wherein said at least two housing parts have longitudinal axes, and said joints each have a respective pivoting axis running transversally to said longitudinal axes of said at least two housing parts.

9. The surge arrester according to claim 6, wherein each respective one of said joints is a ball-and-socket joint, a universal joint or a rotary joint.

10. The surge arrester according to claim 1, wherein said at least two housing parts have outer rotationally mounted ends, and one of said outer rotationally mounted ends of one of said at least two housing parts is suspended on a ground side.

11. The surge arrester according to claim 1, wherein said at least two housing parts have outer rotationally mounted ends, and one of said outer rotationally mounted ends of one of said at least two housing parts is suspended on a voltage side.

12. The surge arrester according to claim 11, wherein the voltage side is a high voltage side.

\* \* \* \* \*